(12) United States Patent
Kim et al.

(10) Patent No.: US 9,903,948 B2
(45) Date of Patent: Feb. 27, 2018

(54) RADAR DETECTION OF A CONCEALED OBJECT ON A BODY

(71) Applicant: Raytheon Company, Waltham, MA (US)

(72) Inventors: Jacob Kim, Dallas, TX (US); William F. Skalenda, Plano, TX (US); John L. Tomich, Coppell, TX (US); Raymond Samaniego, Prosper, TX (US)

(73) Assignee: RAYTHEON COMPANY, Waltham, MA (US)

( * ) Notice: Subject to any disclaimer, the term of this patent is extended or adjusted under 35 U.S.C. 154(b) by 774 days.

(21) Appl. No.: 14/051,037

(22) Filed: Oct. 10, 2013

(65) Prior Publication Data

US 2016/0223666 A1 Aug. 4, 2016

Related U.S. Application Data

(60) Provisional application No. 61/712,232, filed on Oct. 10, 2012.

(51) Int. Cl.
*G01S 13/88* (2006.01)
*G01S 7/02* (2006.01)
(Continued)

(52) U.S. Cl.
CPC ........... *G01S 13/887* (2013.01); *G01S 7/025* (2013.01); *G01S 7/354* (2013.01); *G01S 7/411* (2013.01); *G01S 7/412* (2013.01)

(58) Field of Classification Search
CPC .... G01S 13/885; G01S 13/887; G01S 13/888; G01S 13/04; G01S 7/024; G01S 7/025;
(Continued)

(56) References Cited

U.S. PATENT DOCUMENTS 4,839,654 A * 6/1989 Ito .......................... G01V 3/12
342/22
5,159,343 A * 10/1992 Harmuth ................ G01S 13/10
342/145
(Continued)

FOREIGN PATENT DOCUMENTS

WO      WO 00/75892 A2     12/2000

OTHER PUBLICATIONS

Written Opinion in related International Application No. PCT/US2013/064179, dated Jul. 23, 2014 (5 pgs.).
(Continued)

*Primary Examiner* — Matthew M Barker
(74) *Attorney, Agent, or Firm* — Lewis Roca Rothgerber Christie, LLP

(57) ABSTRACT

A method for detecting a concealed material in a target comprising a body and the concealed material, the method comprising: emitting radio frequency (RF) energy toward a direction of the target, capturing a signal corresponding to a scattered RF energy reflected from the target, measuring a first mean signal level in a first frequency band of the signal, measuring a second mean signal level in a second frequency band of the signal, and detecting the concealed material when the difference between the first mean signal level and the second mean signal level is above a threshold.

15 Claims, 4 Drawing Sheets

(51) Int. Cl.
  *G01S 7/41* (2006.01)
  *G01S 7/35* (2006.01)

(58) Field of Classification Search
  CPC .......... G01S 7/026; G01S 7/354; G01S 7/411; G01S 7/412; F41H 11/136; G01V 3/12
  USPC ............................................ 342/22, 27, 188
  See application file for complete search history.

(56) References Cited

U.S. PATENT DOCUMENTS

| | | | | |
|---|---|---|---|---|
| 5,339,080 | A * | 8/1994 | Steinway | G01S 13/0209 342/129 |
| 5,828,331 | A * | 10/1998 | Harper | G01H 9/00 342/192 |
| 6,121,920 | A * | 9/2000 | Barrett | G01S 7/024 342/188 |
| 6,243,036 | B1 * | 6/2001 | Chadwick | G01S 7/025 342/175 |
| 6,856,271 | B1 * | 2/2005 | Hausner | G01S 7/025 342/189 |
| 6,967,612 | B1 * | 11/2005 | Gorman | G01S 7/412 342/175 |
| 7,492,303 | B1 * | 2/2009 | Levitan | G01S 7/024 342/188 |
| 7,515,089 | B2 * | 4/2009 | Szajnowski | G01S 7/292 342/175 |
| 8,730,098 | B1 * | 5/2014 | Fox | G01S 13/04 342/175 |
| 8,884,807 | B1 * | 11/2014 | Johansson | G01S 13/885 342/175 |
| 2002/0175849 | A1 * | 11/2002 | Arndt | F41H 11/12 342/22 |
| 2004/0183712 | A1 * | 9/2004 | Levitan | F41H 13/00 342/22 |
| 2005/0099330 | A1 * | 5/2005 | Hausner | G01S 7/025 342/22 |
| 2005/0231421 | A1 * | 10/2005 | Fleisher | G01S 7/411 342/179 |
| 2006/0164287 | A1 * | 7/2006 | Holt | G01S 13/887 342/22 |
| 2006/0238401 | A1 * | 10/2006 | Wuersch | G01V 3/15 342/22 |
| 2008/0129581 | A1 | 6/2008 | Douglass et al. | |
| 2008/0211711 | A1 | 9/2008 | Mostov et al. | |
| 2008/0284636 | A1 * | 11/2008 | Hausner | G01V 3/12 342/22 |
| 2009/0058710 | A1 | 3/2009 | Levitan et al. | |
| 2009/0284405 | A1 * | 11/2009 | Salmon | G01K 11/006 342/22 |
| 2010/0214154 | A1 | 8/2010 | Birdsong, Jr. et al. | |
| 2011/0006940 | A1 * | 1/2011 | Andersson | G01S 13/0209 342/22 |
| 2011/0115667 | A1 * | 5/2011 | Feigin | G01S 7/4008 342/22 |
| 2011/0227777 | A1 * | 9/2011 | Lee | G01S 13/888 342/22 |
| 2012/0162002 | A1 * | 6/2012 | Semenov | A61B 5/0507 342/22 |
| 2012/0229322 | A1 * | 9/2012 | Mostov | G01S 7/024 342/22 |
| 2012/0293355 | A1 * | 11/2012 | Marianer | G01S 7/024 342/22 |
| 2013/0135136 | A1 * | 5/2013 | Haynes | G01S 13/89 342/22 |
| 2013/0169466 | A1 * | 7/2013 | Frederick | G08B 13/248 342/22 |
| 2014/0240161 | A1 | 8/2014 | Davidson | |
| 2016/0223666 | A1 * | 8/2016 | Kim | G01S 7/025 |

OTHER PUBLICATIONS

International Search Report in related International Application No. PCT/US2013/064179, dated Jul. 23, 2014 (4 pgs.).
EPO Communication from related European Application No. 13 849 971.0, EPO Communication dated Mar. 10, 2017 (5 pgs.).
Non-final Office action from related U.S. Appl. No. 14/435,158, Non-final Office action dated Feb. 9, 2017 (12 pgs.).
Final Office action from related U.S. Appl. No. 14/435,158, Final Office action dated May 23, 2017 (13 pgs.).
Notice of Allowance in related U.S. Appl. No. 14/435,158, Notice of Allowance dated Aug. 21, 2017 (11 pgs.).

* cited by examiner

RADAR DETECTION OF A CONCEALED OBJECT ON A BODY

CROSS-REFERENCE TO RELATED APPLICATION

This application claims priority to and the benefit of U.S. Patent Application No. 61/712,232, filed on Oct. 10, 2012, the entire content of which is incorporated herein by reference.

This application is also related to a National Phase Patent Application of International Patent Application entitled Detection of Concealed Object on a Body Using Radio Frequency Signatures on Frequencies and Polarizations (attorney docket R691:73795. WO), filed on Oct. 9, 2013 herewith, the entire content of which is incorporated herein by reference.

FIELD

Embodiments of the present invention relate to the field of object detection, and more specifically to the detection of concealed objects on a target.

BACKGROUND

In recent years, there has been a growing threat of concealed objects such as weapons and suicide vests housing improvised explosive devices (IEDs) on, for example, a person's body or a vehicle. Current radio frequency (RF) detection systems consist of millimeter wave or terahertz imaging systems looking for image anomalies indicative of concealed objects. However, high-resolution imaging processes are often computationally expensive and time consuming. Further, it may be difficult to find image anomalies due to various factors such as movement of the body or the concealed object, aliases, and other imaging resolution issues. These issues may lead to a low probability of detection and/or a high probability of false alarms. Furthermore, the millimeter wave or the terahertz radar systems would also require high power transmission due to high RF propagation loss (e.g., greater than 90 dB) at the tactical ranges (e.g., 20 m-100 m). Note that high power RF transmission can cause a serious radiation hazard problem to persons in proximity to the target area.

Accordingly, what is desired is a low-cost, low-power solution that does not expose persons in a target area to high levels of RF radiation, and which has a high probability of detection of the concealed object and low probability of false alarms.

Further, it is desired to develop a radar solution for real-time detection of concealed objects on a target's body at a tactical stand-off range of, for example, 20 m-100 m (which would permit an operator sufficient time/space to safely nullify a detected threat).

SUMMARY

According to embodiments of the present invention, the presence of concealed objects is detected by observing the scattering response of a target, measuring the mean values of radio frequency (RF) scattering from the target, and discriminating the mean values from the resonance signatures and non-resonance signatures in predetermined frequency bands.

According to embodiments of the present invention, there is provided a method for detecting a concealed material in a target including a body and the concealed material, the method including: emitting RF energy toward a direction of the target; capturing a signal corresponding to a scattered RF energy reflected from the target; measuring a first mean signal level in a first frequency band of the signal; measuring a second mean signal level in a second frequency band of the signal; and detecting the concealed material when the difference between the first mean signal level and the second mean signal level is above a threshold.

The emitting RF energy may further include: emitting RF energy of one or more of a horizontal polarity and a vertical polarity.

The captured scattered RF energy reflected from the target may have a horizontal or vertical polarization.

The first frequency band may be a frequency range in which the concealed material has a resonant RF scattering response; and the second frequency band may be a frequency range in which the concealed material lacks a resonant RF scattering response.

The first frequency band and the second frequency band may be frequency ranges in which the body lacks a resonant RF scattering response.

According to embodiments of the present invention, there is provided a radar detector configured to detect a concealed material in a target including a body and the concealed material, the radar detector including: an emitter configured to emit RF energy toward a direction of the target; a receiver configured to capture a signal corresponding to a scattered RF energy reflected from the target; and a processor configured to measure a first mean signal level in a first frequency band of the signal, to measure a second mean signal level in a second frequency band of the signal, and to detect the concealed material when the difference between the first mean signal level and the second mean signal level is at or above a threshold.

The emitter may emit RF energy of a horizontal or vertical polarity.

The captured scattered RF energy reflected from the target may have a horizontal or vertical polarization.

The first frequency band may be a frequency range in which the concealed material has a resonant RF scattering response, but, in which the body lacks a resonant RF scattering response.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

Figure 1:
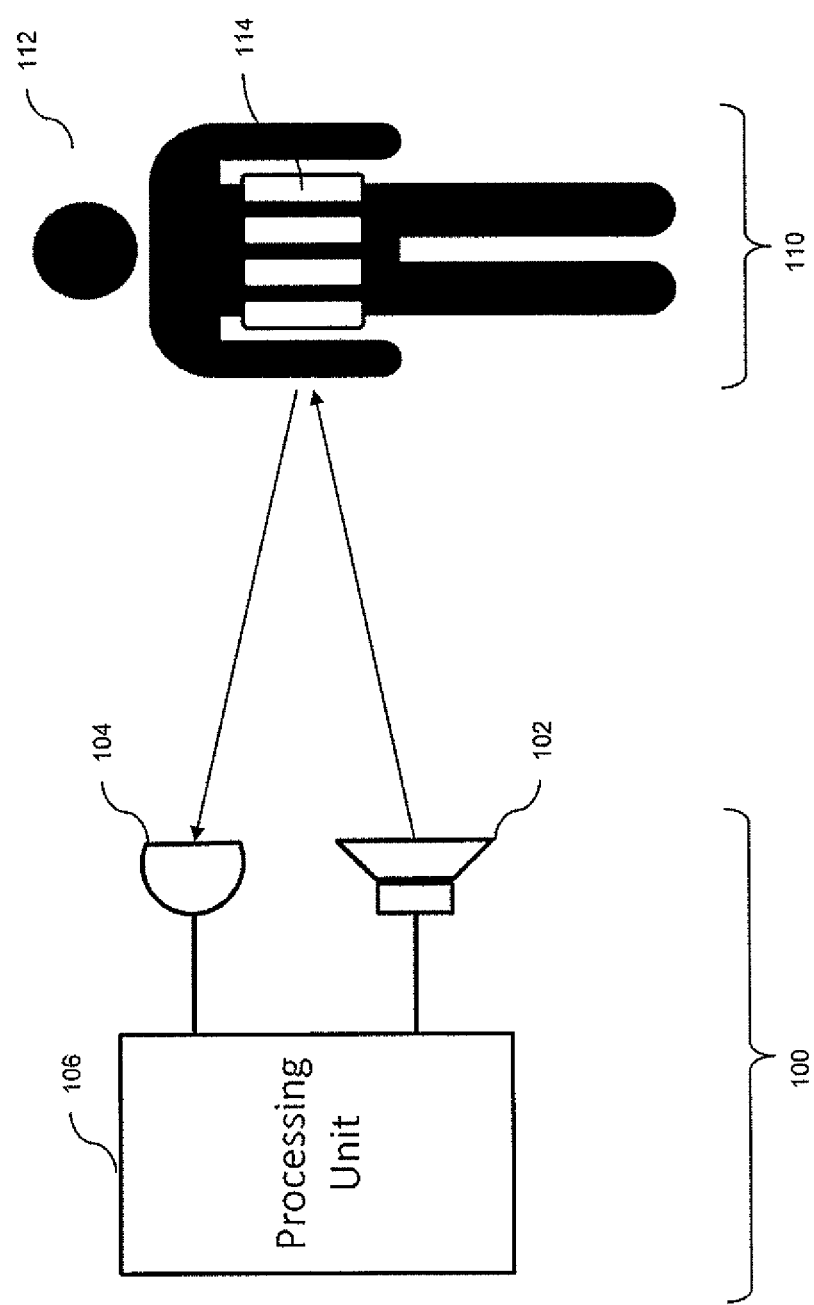
FIG. 1 is a schematic diagram illustrating a concealed object radar detection (CORD) system that utilizes RF scattering values for various frequency bands and polarizations to identify an object of interest on a target body, according to some embodiments of the present invention.

In the following detailed description, only certain example embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

In certain locations, such as airports and security check points, it may be desired to identify a body, such as a person or vehicle, which is carrying a concealed object of interest, for example, a weapon or a suicide bomber vest (SBV). A concealed object may be a complex system having a number of components and comprising different materials. For example, a SBV may consist of trigger circuitry, connecting wires, blocks of improvised explosive devices (IEDs), and shrapnel (e.g., nails). Each constituent part may have its own unique RF scattering signature over a frequency range and a particular polarization. Frequencies at which the amplitude of the RF scattering response is a relative maximum are known as resonant frequencies.

Embodiments of the present invention are directed to an apparatus and method for determining the presence of a concealed object (e.g., an IED) on a target by discrimination of mean values of RF scattering from resonance signatures and non-resonance signatures at predetermined frequency bands, respectively. According to some embodiments of the present invention, the concealed-object radar detection (CORD) system can detect concealed objects on a target body at tactically significant ranges (e.g., 20 m-100 m). In some embodiments, the detection system can also be low-cost and wide-band (e.g., having a 3:1 fractional bandwidth), since algorithms for detection and discrimination are computationally simple and 3:1 bandwidth radar antenna systems are readily available.

Because some embodiments of the present invention operate at frequency ranges that have low RF propagation loss at tactical ranges, high power transmission may not be necessary.

(For example, the free space propagation loss at UHF bands is only a fraction (less than −20 dB) of that at millimeter or terahertz bands.) As such, the CORD system, according to some embodiments, may pose no radiation risk to people in or near a target area. Further, by tuning the discrimination algorithm for a concealed object of interest through the selection of appropriate frequency bands and polarization(s), the CORD system may exhibit high probability of detection ($P_{detection}$) of the object of interest and low probability of false alarms ($P_{false\ alarm}$).

FIG. 1 is a schematic diagram illustrating a CORD system that utilizes RF scattering values for various frequency bands and polarizations to identify an object of interest on a target body, according to some embodiments of the present invention.

According to some embodiments of the present invention, the CORD system 100 includes an emitter 102 (e.g., an RF horn antenna), a receiver 104 (e.g., a tuned RF receiver), and a processing unit 106. In some examples, the emitter 102 emits RF energy in the direction of a target area. In other examples, the emitter 102 may scan a wide span area. The transmitted RF energy may have a horizontal polarization (H-pol) and/or a vertical polarization (V-pol). The transmitted energy may have a wide frequency range (e.g., 2 GHz-18 GHz) or may have frequencies occupying two or more narrow bands (e.g., 3 GHz-5 GHz and 7 GHz-9 GHz).

The receiver 104 receives the RF energy that is scattered off of the object(s) and/or person(s) in the target area and sends a corresponding signal to the processing unit 106. The target area may encompass a target 110, which, for example, may be a person 112 wearing a concealed object of interest 114 such as weapon or SBV. The receiver 104 may be tuned to capture the horizontal and/or vertical polarization of the scattered RF energy. The receiver 104 may be a wide-band receiver capturing energy in a wide range of frequencies, such as 2 GHz-18 GHz, or may be tuned to selectively capture energy of two or more narrow frequency bands, for example, a first frequency band between 3 GHz and 5 GHz and a second frequency band between 7 GHz and 9 GHz.

The processing unit 106 measures a first mean value of the signal levels in a first frequency band (e.g., 3 GHz-5 GHz) and the second mean value of the signal levels in a second frequency band (e.g., 7 GHz-9 GHz). The first frequency band may represent a frequency range in which the concealed object of interest (or material of interest) 114 exhibits a resonance (or a local maximum in the RF scattering amplitude), and the second frequency band may represent a frequency range in which the concealed object of interest 114 lacks a resonance. If the difference between the first mean signal level and the second mean signal level (as measured, for example, in dB) is at or above a threshold, then the processing unit 106 may determine that a concealed object of interest 114 has been detected.

Figure 2:
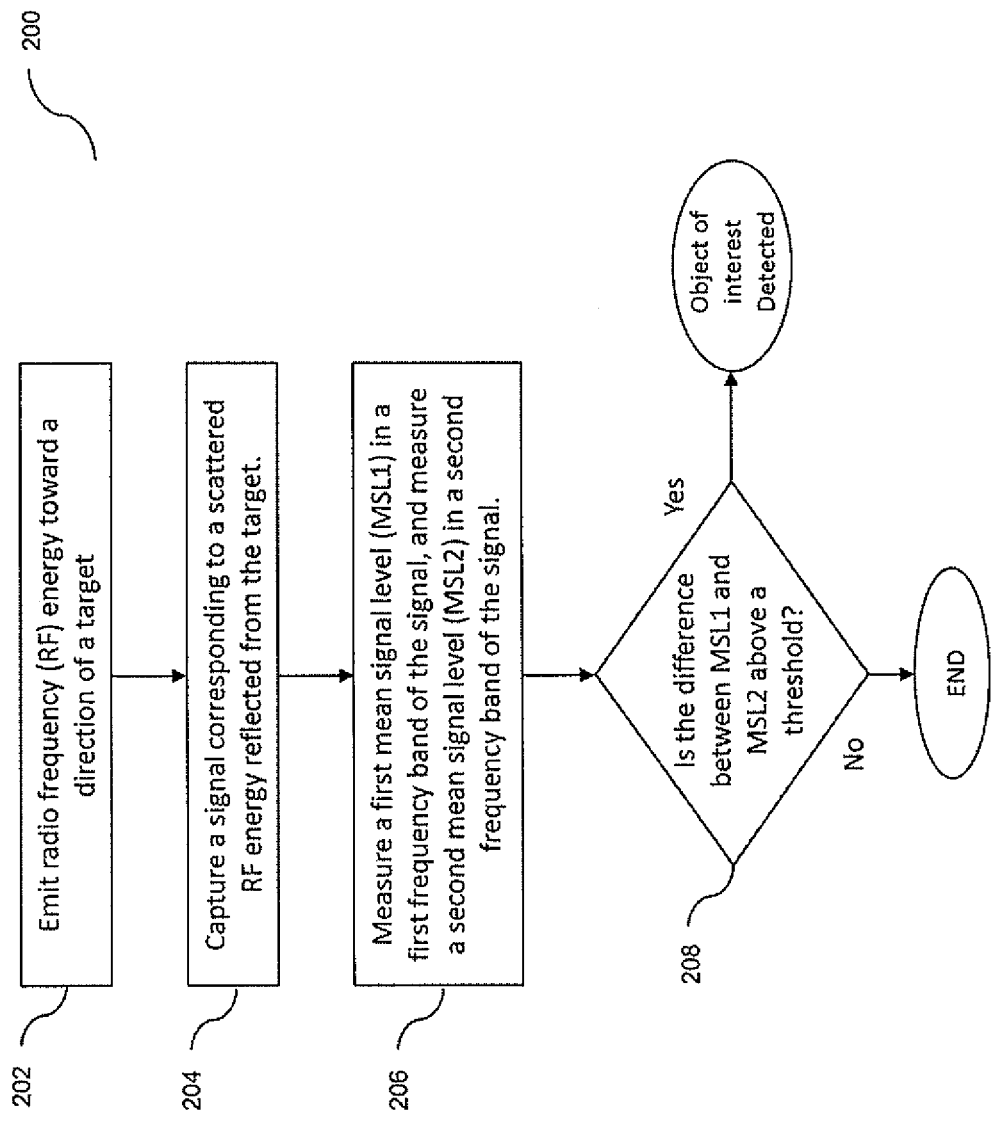
FIG. 2 is a flow diagram illustrating the process for detecting a concealed object on a target based on discrimination of the RF signature of the concealed object and the target body, according to some embodiments of the present invention.

FIG. 2 is a flow diagram illustrating a process 200 for detecting a concealed object on a target based on discrimination of the RF scattering signature of the concealed object and the target body, according to some embodiments of the present invention.

In block 202, the emitter 102 of the CORD system 100 emits a radio wave of one or more frequency ranges toward a direction of a target area encompassing one or more objects and/or persons, which may or may not include a concealed object of interest. According to some embodiments, the transmitted radio wave may have a horizontal and/or vertical polarization.

In block 204, the receiver 104 receives reflected radio waves that are scattered off of one or more objects and/or persons in the target area. The receiver 104 may be designed to receive radio waves of one or more frequency ranges (e.g., radio waves having a wide range of frequencies or only those that have frequencies in two narrow bands). Further, in some embodiments, the receiver 104 may filter radio waves of a horizontal or vertical polarization. The receiver 104 then generates a signal corresponding to the received scattered radio waves and transmits the signal to the processing unit 106 for further analysis.

In block 206, the processing unit 106 calculates an average signal power level for each of two frequency bands that include one frequency range in which a concealed object of interest (or material of interest) displays a resonant scattering response (i.e., a resonant frequency band), and one frequency range in which the concealed object of interest does not display a resonant scattering response (non-resonant frequency band). According to some embodiments, the resonant frequency band may be empirically chosen as a band in which an object of interest does display a resonant response, but persons or objects that are not of interest (e.g., a human body) do not. Further, in some embodiments, the non-resonant frequency band may be empirically chosen as a band in which an object of interest does not display a resonant response.

In block 208, the processing unit 106 employs a discrimination algorithm, which subtracts the average signal power level of the resonant frequency band from the average signal power level of the non-resonant frequency band. If the difference is greater than a predetermined threshold, the processing unit 106 determines that a concealed object of interest is present and issues an alert. If the difference does not exceed the threshold, then the processing unit 106 determines that no object of interest is present and the process may end or reinitiate at block 202.

According to some embodiments, prior to comparing the difference with the threshold value, the receiver 104 and/or the processing unit 106 filter the signal to remove/reduce noise and/or other undesired artifacts, and perform other suitable processes to facilitate proper comparison of values.

While the above process describes the detection of one object of interest, using two frequency bands, embodiments of the invention are not limited thereto. For example, according to some embodiments of the present invention, more than one resonant frequency band and/or more than one non-resonant frequency band may be analyzed to detect the presence of a single object of interest. In some of these embodiments, the processing unit 106 calculates the averages of the mean signal levels of the resonant frequency bands and/or non-resonant frequency bands, and subtracts the averages and compares the difference with a threshold associated with the object of interest. Alternatively, the discrimination algorithm may pair each of the resonant frequency bands with the non-resonant bands and calculate differences of mean signal levels for each pair and compare each difference value with one or more associated thresholds. An analysis of the comparison results based on a predetermined logic may lead to a determination of the existence, or lack thereof, of an object of interest.

Further, the discrimination algorithm may be modified to detect two or more objects of interest, which have different RF scattering signatures. According to some embodiments, each object of interest is associated with a different pair of resonant and non-resonant frequency bands. Accordingly, the processing unit 106 may associate each pair of bands with a threshold value. When the difference between the mean signal levels of the resonant and non-resonant frequency bands of a pair exceeds an associated threshold, the processing unit 106 may determine that the associated object of interest is present.

The resonant and non-resonant frequency bands, the transmit and receive polarities, threshold(s), and/or any other relevant data associate with each object of interest may be stored in a data record (such as a database or a look-up table), which may reside in the processing unit 106 or be external to it. Using the data record and methods similar to those described above, the processing unit 106 may be able to detect the presence of multiple objects of interest using a single captured RF scattering signal.

Figure 3:
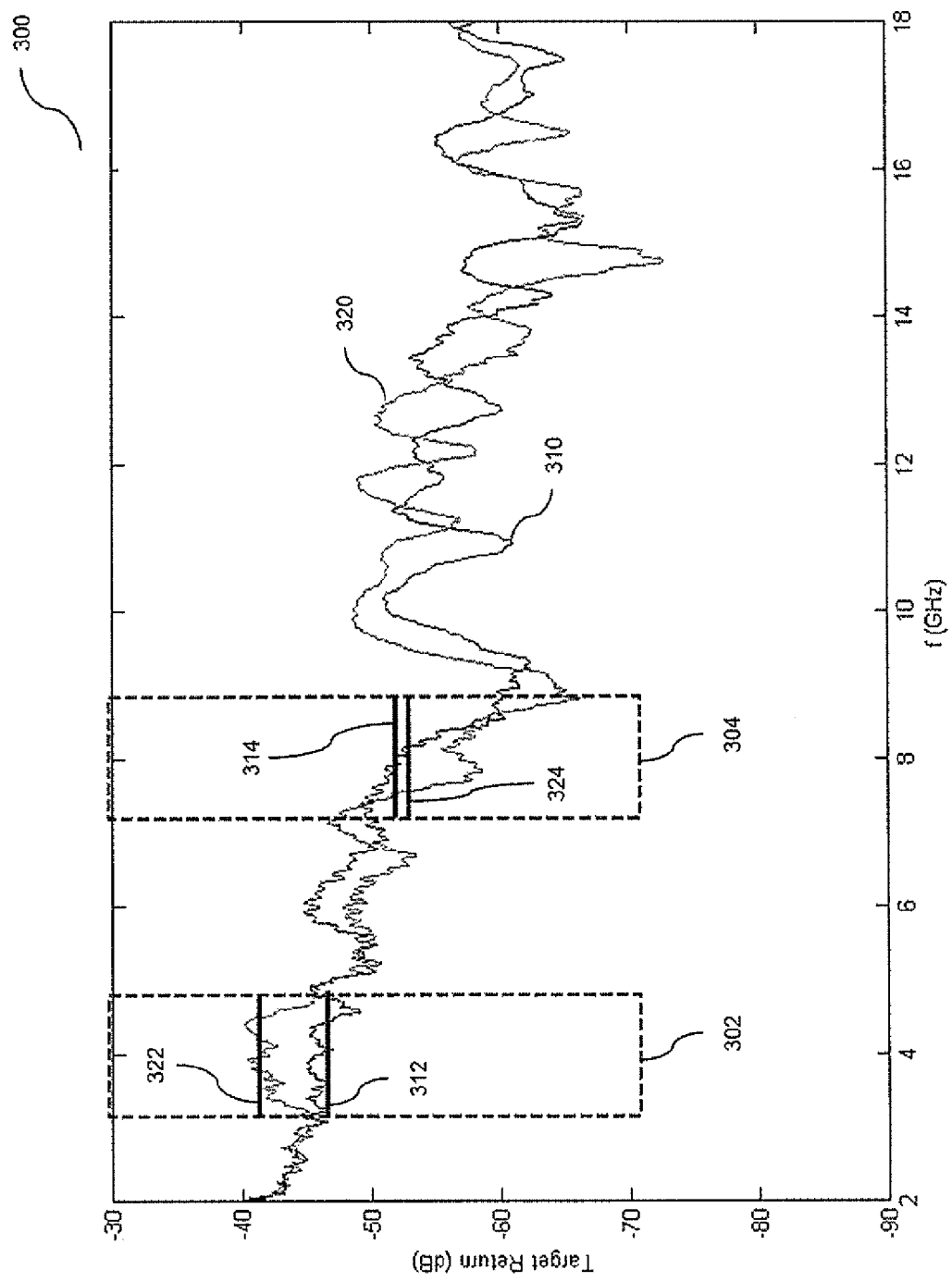
FIG. 3 is a graph illustrating the vertical-polarity component of the RF scattering response of a human body and that of a human body donning a vest containing simulated explosive material, according to an embodiment of the present invention.

FIG. 3 is a graph 300 illustrating the vertical-polarity component of the RF scattering response of a human body and that of a human body donning a vest containing simulated explosive material, according to an embodiment of the present invention.

In the embodiment of FIG. 3, The X-axis represents the range of frequencies within the bandwidth of the receiver 104 (i.e., 2 GHz-18 GHz) and the Y-axis represents the power level of the V-pol component of the received scattered radio wave relative to that of the transmitted radio wave measured in decibels. The V-pol component of the RF scattering response of a human body (HB) is shown as a HB signature 310, and the V-pol component of the RF scattering response of a human body wearing a simulated suicide bomber vest (HBV) is shown as a HBV signature 320. For the purpose of clarity of illustration, the raw data used to generate graph 300 has been smoothed and background noise has been subtracted.

The signal levels of the HB signature 310 and the HBV signature 320 in the first band 302 have mean values (MVs) shown as MV 312 and 322, respectively. Further, the signal levels of the HB signature 310 and the HBV signature 320 in the second band 304 have mean values shown as MV 314 and 324, respectively.

As shown, the HBV signature 320 exhibits a resonant response at the first band 302, while the HB signature 310 does not. However, neither signature appears to show any resonance in the second band 304. By selecting a threshold value that exceeds the difference between MV 312 and MV 314 but which is less than the difference between the MV 322 and MV 324, the discrimination algorithm implementing process 200 can be tuned to discriminate between a human body and a human body donning the simulated suicide bomber vest based on the V-pol component of the received scattered RF radio wave.

Figure 4:
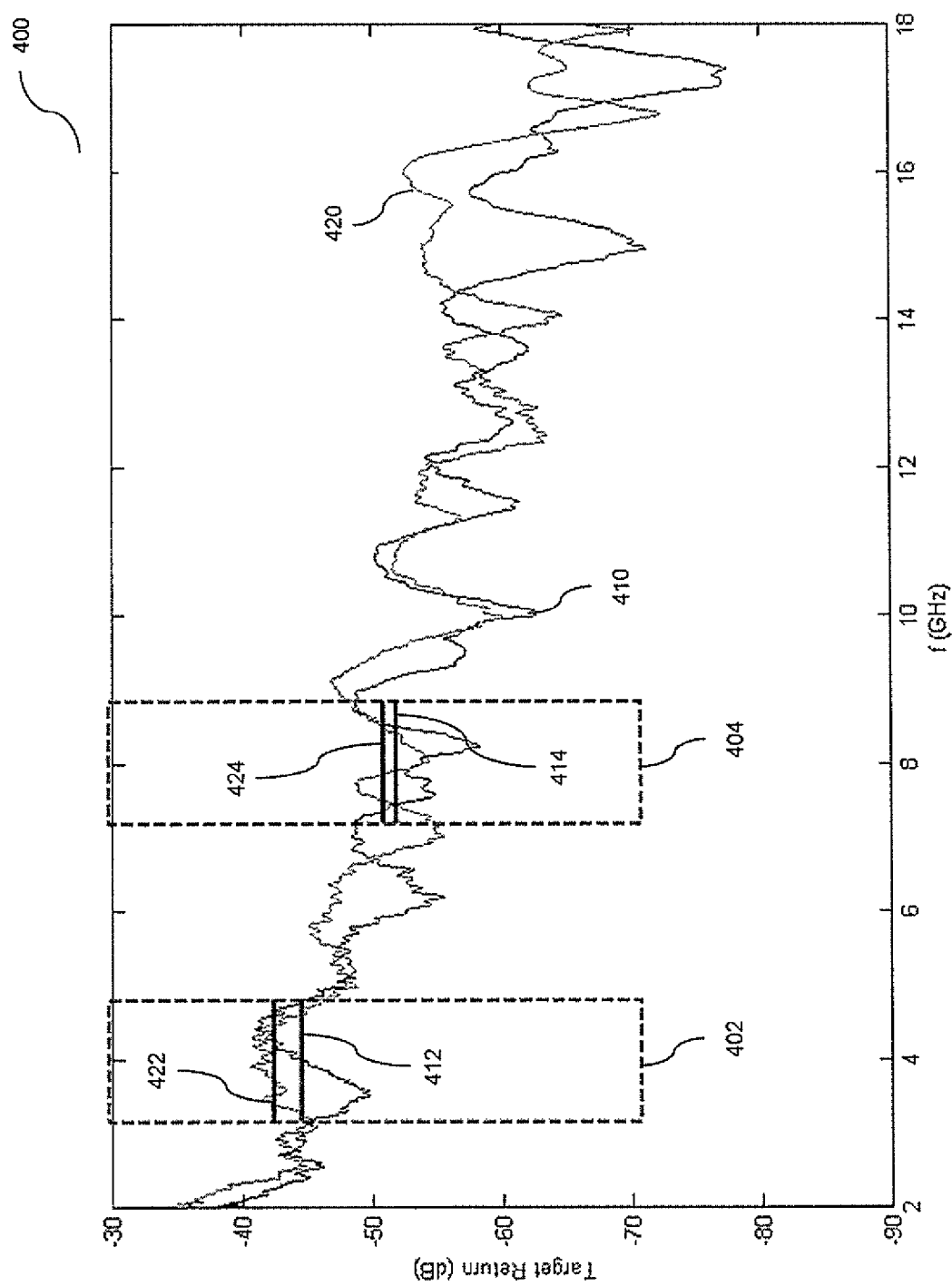
FIG. 4 is a graph illustrating the horizontal-polarity component of the RF scattering response of a human body and that of a human body donning a vest containing simulated explosive material, according to an embodiment of the present invention.

FIG. 4 is a graph 400 illustrating the horizontal-polarity component of the RF scattering response of a human body and that of a human body donning a vest containing simulated explosive material, according to an embodiment of the present invention.

The H-pol component of the RF scattering response of a human body is shown as HB signature 410, and the H-pol component of the RF scattering response of a human body wearing a simulated suicide bomber vest is shown as the HBV signature 420. As in FIG. 3, for the purpose of clarity of illustration, the raw data used to generate graph 400 has been smoothed and background noise has been subtracted. The signal levels of the HB signature 410 and the HBV signature signature 420 in the first band 402 have mean values shown as MV 412 and 422, respectively. Further, the signal levels of the HB signature 410 and the HBV signature 420 in the second band 404 have mean values shown as MV 414 and 424, respectively.

Unlike FIG. 3, the HBV signature 420 of FIG. 4 does not exhibit large resonance at the first band 402. However, as can be seen from FIG. 4, it is still possible to select a threshold value that exceeds the difference between MV 412 and MV 414 but which is less than the difference between the MV 422 and MV 424, and to adjust the discrimination algorithm to discriminate between a human body and a human body donning the simulated suicide bomber vest based on the H-pol component of the received scattered RF radio wave. However, because the mean values of the two signatures in the first and second bands are close, the probability of detection ($P_{detection}$) may be reduced and the probability of false alarms ($P_{false\ alarm}$) may be increased. Thus, by comparing the graphs of FIGS. 3 and 4, it is apparent that a CORD system designed to detect the simulated SBV of this example would be robust (e.g., have higher $P_{detection}$ and lower $P_{false\ alarm}$) if the V-pol component of the scattered RF radio waves is analyzed rather than the H-pol component.

As a person of ordinary skill in the art will recognize, the method and apparatus described herein may be complimented with other commonly known radar techniques (e.g., direction finding algorithms, range gating, etc.) to not only detect the presence of a concealed object of interest, but also to locate its position in an open environment (e.g., locating a suicide bomber in a large crowd of people).

What is claimed is:

1. A method for detecting a concealed material in a target comprising a body and the concealed material, the method comprising:

emitting, by an emitter, radio frequency (RF) energy toward a direction of the target;

capturing, by a receiver, a signal corresponding to a scattered RF energy reflected from the target, the captured RF energy being in a first frequency band and a second frequency band;

measuring, by a processor, a first mean signal level in the first frequency band of the signal and a second mean signal level in the second frequency band of the signal, the first frequency band being a frequency range in which the concealed material has a resonant RF scattering response, and the second frequency band being a frequency range in which the concealed material lacks a resonant RF scattering response; and detecting, by the processor, the concealed material when the difference between the first mean signal level and the second mean signal level is above a threshold.

2. The method of claim 1, wherein the emitting RF energy further comprises:

emitting RF energy of one or more of a horizontal polarity and a vertical polarity.

3. The method of claim 1, wherein the captured scattered RF energy reflected from the target has a horizontal polarization.

4. The method of claim 1, wherein the captured scattered RF energy reflected from the target has a vertical polarization.

5. The method of claim 1, wherein the first frequency band is a frequency range in which the body lacks a resonant RF scattering response.

6. The method of claim 1, wherein the body is a human body and the second frequency band is a frequency range in which the human body lacks a resonant RF scattering response.

7. The method of claim 1, wherein the body is a biological life form and the concealed material is a concealed weapon.

8. The method of claim 1, further comprising:

retrieving the threshold and the frequency ranges of the first and second frequency bands from a stored data record.

9. A radar detector configured to detect a concealed material in a target comprising a body and the concealed material, the radar detector comprising:

an emitter configured to emit radio frequency (RF) energy toward a direction of the target;

a receiver configured to capture a signal corresponding to a scattered RF energy reflected from the target, the captured RF energy being in a first frequency band and a second frequency band; and a processor configured to measure a first mean signal level in the first frequency band of the signal, to measure a second mean signal level in the second frequency band of the signal, and to detect the concealed material when the difference between the first mean signal level and the second mean signal level is at or above a threshold, wherein the first frequency band is a frequency range in which the concealed material has a resonant RF scattering response wherein the second frequency band is a frequency range in which the concealed material lacks a resonant RF scattering response.

10. The radar detector of claim 9, wherein the emitter emits RF energy of a horizontal polarity or vertical polarity.

11. The radar detector of claim 9, wherein the captured scattered RF energy reflected from the target has a horizontal polarization.

12. The radar detector of claim 9, wherein the captured scattered RF energy reflected from the target has a vertical polarization.

13. The radar detector of claim 9, wherein the first frequency band is a frequency range in which the body lacks a resonant RF scattering response.

14. The radar detector of claim 9, wherein the body is a human body and the second frequency band is a frequency range in which the human body lacks a resonant RF scattering response.

15. The radar detector of claim 9, wherein the body is a human body and the concealed material comprises explosive material or shrapnel.

* * * * *